（12）United States Patent
Fujimoto et al.

(10) Patent No.: US 10,156,719 B2
(45) Date of Patent: Dec. 18, 2018

(54) VIBRATION DEVICE AND CAMERA

(71) Applicant: Murata Manufacturing Co., Ltd., Nagaokakyo-shi, Kyoto-fu (JP)

(72) Inventors: Katsumi Fujimoto, Nagaokakyo (JP); Shinsuke Ikeuchi, Nagaokakyo (JP); Kenji Nishiyama, Nagaokakyo (JP); Masanobu Nomura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/832,853

(22) Filed: Dec. 6, 2017

(65) Prior Publication Data
US 2018/0095272 A1 Apr. 5, 2018

Related U.S. Application Data

(63) Continuation of application No. PCT/JP2016/069399, filed on Jun. 30, 2016.

(30) Foreign Application Priority Data

Aug. 4, 2015 (JP) ................................ 2015-154022

(51) Int. Cl.
*G02B 27/00* (2006.01)
*G03B 17/02* (2006.01)
(Continued)

(52) U.S. Cl.
CPC ............ *G02B 27/0006* (2013.01); *B06B 3/00* (2013.01); *B06B 3/02* (2013.01); *G03B 17/02* (2013.01);
(Continued)

(58) Field of Classification Search
None
See application file for complete search history.

(56) References Cited

U.S. PATENT DOCUMENTS

2008/0309814 A1* 12/2008 Kinoshita ............ G02B 13/001
348/340
2012/0243093 A1* 9/2012 Tonar .................. H01L 41/0973
359/507
(Continued)

FOREIGN PATENT DOCUMENTS

JP 05-032191 U 4/1993
JP 07-151946 A 6/1995
(Continued)

OTHER PUBLICATIONS

Official Communication issued in International Patent Application No. PCT/JP2016/069399, dated Sep. 20, 2016.
(Continued)

*Primary Examiner* — William B Perkey
(74) *Attorney, Agent, or Firm* — Keating & Bennett, LLP

(57) ABSTRACT

A vibration device that is used in a camera body including a lens includes a cylindrical vibrating body including a piezoelectric vibrator, a cylindrical mode converting connected member connected to one end of the cylindrical vibrating body, and a light transmitting body attached to the mode converting connected member. The light transmitting body includes a light transmitting portion disposed on a front side of the lens. The mode converting connected member includes a thin portion having a thickness smaller than a thickness of the cylindrical vibrating body.

22 Claims, 14 Drawing Sheets

(51) Int. Cl.
*G03B 17/08* (2006.01)
*G03B 17/56* (2006.01)
*B06B 3/00* (2006.01)
*B06B 3/02* (2006.01)
*H04N 5/225* (2006.01)
*B06B 1/06* (2006.01)

(52) U.S. Cl.
CPC ............... *G03B 17/56* (2013.01); *B06B 1/06* (2013.01); *G03B 17/08* (2013.01); *H04N 5/2252* (2013.01)

(56) References Cited

U.S. PATENT DOCUMENTS

| | | | | |
|---|---|---|---|---|
| 2014/0033454 | A1* | 2/2014 | Koops | G02B 27/0006 15/94 |
| 2014/0185140 | A1 | 7/2014 | Kawai | |
| 2016/0199881 | A1* | 7/2016 | Akagane | A61B 17/320068 601/2 |
| 2016/0266379 | A1* | 9/2016 | Li | G02B 27/0006 |
| 2018/0095272 | A1* | 4/2018 | Fujimoto | G02B 27/0006 |

FOREIGN PATENT DOCUMENTS

| | | | |
|---|---|---|---|
| JP | 2879155 B2 | 4/1999 | |
| JP | 2007-082062 A | 3/2007 | |
| JP | 2012-070412 A | 4/2012 | |
| JP | 2012-138768 A | 7/2012 | |
| JP | 2013-080177 A | 5/2013 | |
| JP | 2014-120999 A | 6/2014 | |
| JP | WO 2017/110563 A1 * | 6/2017 | ............. G03B 17/08 |
| JP | WO 2017/110564 A1 * | 6/2017 | ............. G03B 17/08 |
| JP | WO 2017/149933 A1 * | 9/2017 | ............. G03B 17/08 |
| JP | WO 2017/221622 A1 * | 12/2017 | ............. G03B 17/08 |

OTHER PUBLICATIONS

Official Communication issued in European Patent Application No. 16832661.9, dated Sep. 21, 2018.

* cited by examiner

VIBRATION DEVICE AND CAMERA

CROSS REFERENCE TO RELATED APPLICATIONS

This application claims the benefit of priority to Japanese Patent Application No. 2015-154022 filed on Aug. 4, 2015 and is a Continuation Application of PCT Application No. PCT/JP2016/069399 filed on Jun. 30, 2016. The entire contents of each application are hereby incorporated herein by reference.

BACKGROUND OF THE INVENTION

1. Field of the Invention

The present invention relates to a vibration device for use in a camera body including a lens, and to a camera.

2. Description of the Related Art

An on-vehicle camera and a camera installed outdoors are exposed to rain. For this reason, a cover made of glass or a transparent plastic material is provided on a front side of a lens. However, if water drops adhere to the cover, the view of the camera becomes unclear. Moreover, images sometimes cannot be taken accurately.

Japanese Unexamined Patent Application Publication No. 2012-138768 discloses a dome-shaped cover for use in such an application. A cylindrical part is connected to the dome-shaped cover, and a piezoelectric ceramic vibrator is mounted in the cylindrical part. By vibrating the piezoelectric ceramic vibrator, the cylindrical part and the dome-shaped cover are vibrated. Water drops adhering to a surface of the dome-shaped cover are thereby removed.

On the other hand, Japanese Unexamined Patent Application Publication No. 2007-82062 discloses a structure in which an ultrasonic transducer, an adhesive layer, and an external lens are arranged on a front side of a camera body. The external lens is vibrated by driving the ultrasonic transducer. Water drops are thereby removed.

To remove water drops in Japanese Unexamined Patent Application Publication No. 2012-138768 and Japanese Unexamined Patent Application Publication No. 2007-82062, it is necessary to greatly vibrate the dome-shaped cover and the external lens. That is, it is necessary to generate a large vibration in the piezoelectric ceramic vibrator and the ultrasonic transducer in the structures of Japanese Unexamined Patent Application Publication No. 2012-138768 and Japanese Unexamined Patent Application Publication No. 2007-82062. For this reason, a large stress is applied to the piezoelectric ceramic vibrator and the ultrasonic transducer. As such, cracks may occur in the piezoelectric ceramic vibrator and the ultrasonic transducer during use and may cause functional failure. In addition, it is required to remove not only the water drops but also, for example, a solution other than water, such as ethanol, a water solution in which, for example, salt or an antifreezing agent (calcium chloride) is dissolved, droplets, such as muddy water, containing impurities that are not dissolved in water, or a colloidal solution such as coffee.

SUMMARY OF THE INVENTION

Preferred embodiments of the present invention provide vibration devices in which, for example, water drops adhering to a cover and a lens are able to be advantageously removed without imposing any heavy load on a piezoelectric vibrator, and cameras including the vibration devices.

According to a preferred embodiment of the present invention, a vibration device used in a camera body including a lens includes a cylindrical vibrating body including a cylindrical member and a piezoelectric vibrator fixed to the cylindrical member, a cylindrical mode converting connected member connected to one end of the cylindrical vibrating body, and a light transmitting body bonded to a side of the mode converting connected member opposite from a side to which the cylindrical vibrating body is connected, and disposed on a front side of the lens. The mode converting connected member includes a thin portion having a thickness smaller than a thickness of the cylindrical vibrating body.

According to another preferred embodiment of the present invention, a vibration device used in a camera body including a lens includes a cylindrical vibrating body including a cylindrical member and a piezoelectric vibrator fixed to the cylindrical member, and a cylindrical mode converting connected member connected to one end of the cylindrical vibrating body and bonded to the lens of the camera on a side opposite from a side connected to the one end of the cylindrical vibrating body. The mode converting connected member includes a thin portion having a thickness smaller than a thickness of the cylindrical vibrating body.

According to a preferred embodiment of the present invention, the mode converting connected member converts a vibration mode of the cylindrical vibrating body into a vibration mode of the light transmitting body and increases vibration.

According to a preferred embodiment of the present invention, a volume of the mode converting connected member is preferably smaller than a volume of the cylindrical vibrating body. In this case, vibration of the cylindrical vibrating body is able to be further increased in the mode converting connected member.

According to another vibration device of a preferred embodiment of the present invention, the piezoelectric vibrator is preferably cylindrical or substantially cylindrical.

According to a further preferred embodiment of the present invention, a resonant frequency of the vibration mode in the light transmitting body is preferably equal or substantially equal to a resonant frequency of a vibration mode of a longitudinal effect or a transverse effect in the cylindrical vibrating body. In this case, conversion of the vibration mode and an increase of the vibration is able to be achieved more effectively.

According to a further preferred embodiment of the present invention, a resonant frequency of the vibration mode in the lens is preferably equal or substantially equal to a resonant frequency of a vibration mode of a longitudinal effect or a transverse effect in the cylindrical vibrating body.

According to a still further preferred embodiment of the present invention, an outwardly extending flange is provided at an end of the cylindrical vibrating body on a side of the mode converting connected member. Preferably, a node of a vibration of the cylindrical vibrating body exists in the flange. Since leakage of vibration to the outside is able to be reduced or prevented in this case, the vibration is able to be more effectively increased in the mode converting connected member.

According to a still further preferred embodiment of the present invention, the cylindrical vibrating body preferably has a circular or substantially circular cylindrical shape. However, in various preferred embodiments of the present invention, the cylindrical vibrating body may have a rectangular or substantially rectangular cylindrical shape.

According to a still further preferred embodiment of the present invention, the mode converting connected member preferably has a circular or substantially circular cylindrical shape. In this case, the mode converting connected member is able to be advantageously connected to the dome-shaped or disc-shaped light transmitting body.

According to a still preferred embodiment of the present invention, the light transmitting body preferably has a dome shape including a curved light transmitting portion disposed on a front side of the lens. In this case, a portion of the camera body where the lens is provided is able to be easily stored in the dome shape and a wide angle view is able to be achieved.

According to a still further preferred embodiment of the present invention, a vibration mode in the dome-shaped light transmitting body is preferably a breathing vibration mode.

According to a still further preferred embodiment of the present invention, a vibration mode of the dome-shaped light transmitting body is preferably a bending vibration mode.

According to a still further preferred embodiment of the present invention, a vibration mode of the lens is preferably a breathing vibration mode.

According to a still further preferred embodiment of the present invention, a vibration mode of the lens is preferably a bending vibration mode.

According to a still further preferred embodiment of the present invention, the mode converting connected member is preferably defined by a cylindrical or substantially cylindrical body having the same or substantially the same outer diameter as an outer diameter of the cylindrical vibrating body.

According to a still further preferred embodiment of the present invention, the mode converting connected member is preferably defined by a cylindrical or substantially cylindrical body that is thinner than the cylindrical vibrating body.

According to a still further preferred embodiment of the present invention, at least one of an outer diameter and an inner diameter of the mode converting connected member preferably continuously changes from an end portion near the cylindrical vibrating body toward the light transmitting body.

According to a still further preferred embodiment of the present invention, a flange extending toward a center portion of the cylindrical body or an outer side portion of the cylindrical body is preferably provided at an end of the mode converting connected member near the light transmitting body.

A camera according to a preferred embodiment of the present invention includes the vibration device configured according to a preferred embodiment of the present invention and a camera body with at least a portion thereof being provided in the vibration device.

In vibration devices according to various preferred embodiment of the present invention, the light transmitting body and the lens are able to be greatly vibrated by the actions of the mode converting connected member converting the vibration mode and increasing the vibration without imposing any heavy load on the piezoelectric vibrator. Therefore, for example, water drops adhering to the light transmitting body and the lens are able to be advantageously removed.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The present invention will be made clear by explaining specific preferred embodiments of the present invention with reference to the drawings.

It is noted that each of the preferred embodiments described in this description is illustrative and that the structures shown in different preferred embodiments may be partially replaced or combined.

Figure 1:
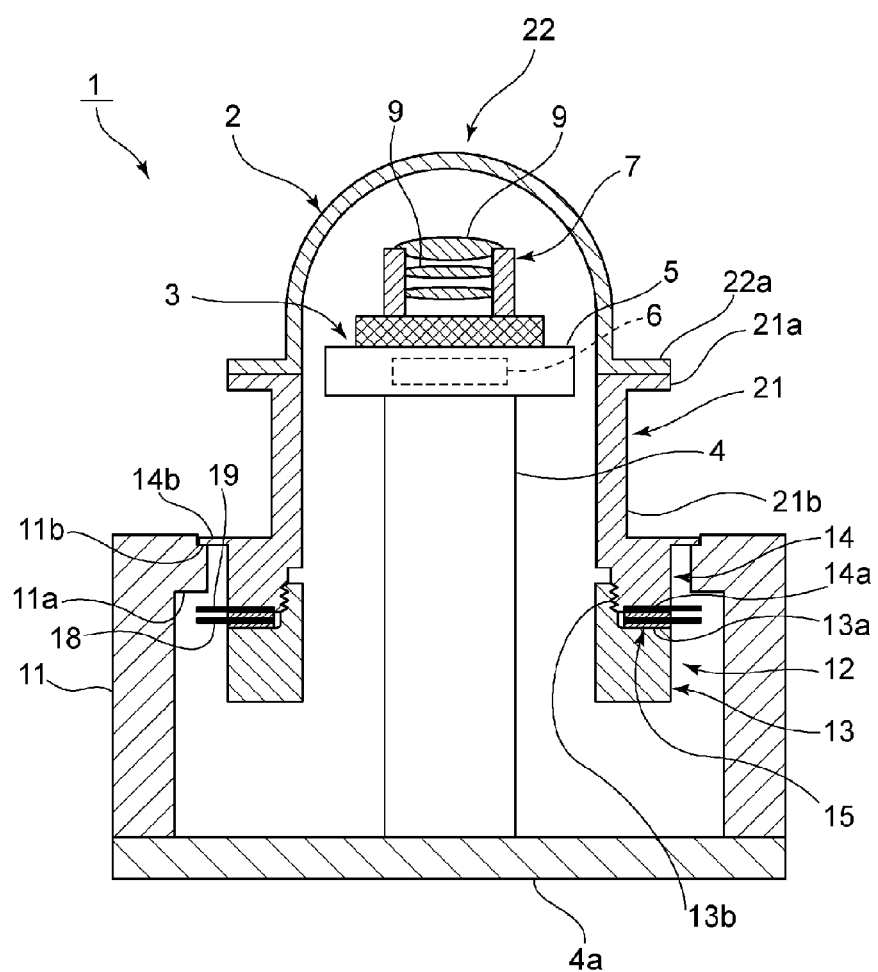
FIG. 1 is a schematic sectional front view of a camera according to a first preferred embodiment of the present invention.
Figure 2:
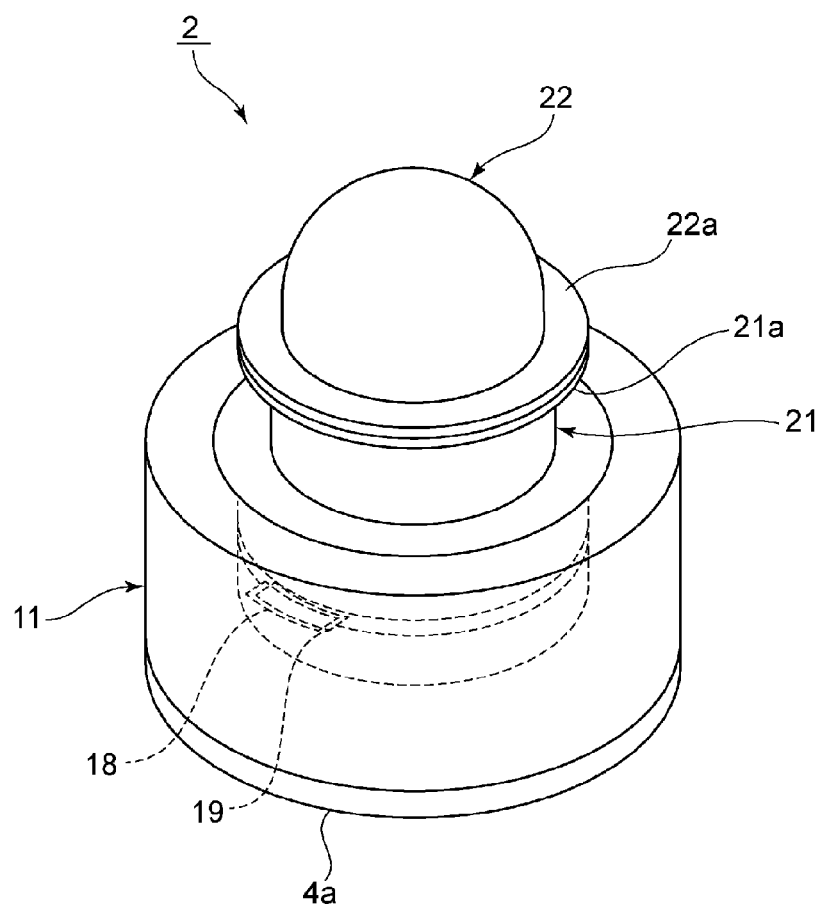
FIG. 2 is a perspective view of a vibration device used in the first preferred embodiment of the present invention.

FIG. 1 is a schematic sectional front view of a camera according to a first preferred embodiment of the present invention, and FIG. 2 is a perspective view of a vibration device used in the first preferred embodiment.

As illustrated in FIG. 1, a camera 1 includes a vibration device 2 that also defines and functions as a camera cover, and a camera body 3 provided inside the vibration device 2.

The camera body 3 includes a cylindrical body member 4. A lower end of the body member 4 is fixed to a base plate 4a. An imaging member 5 is fixed to an upper end of the body member 4. A circuit 6 including an image pickup element is provided inside the imaging member 5. A lens module 7 is fixed to be opposed to the imaging member 5. The lens module 7 is includes a cylindrical body and a plurality of lenses 9 therein.

The structure of the camera body 3 is not particularly limited as long as the camera body 3 is able to image a subject located on a front side of the lenses 9.

The vibration device 2 includes a cylindrical case member 11. In this preferred embodiment, the cylindrical case member 11 preferably has a circular or substantially circular cylindrical shape. However, the case member 11 may have other shapes, for example, a rectangular or substantially rectangular cylindrical shape. For example, the case member 11 may preferably be made of metal or synthetic resin.

A lower end of the case member 11 is fixed to the base plate 4a. On an upper end side of the case member 11, a cylindrical projecting portion 11a projects inward in the radial direction. In an upper surface of the projecting portion 11a, a recess 11b preferably having a circular or substantially circular cylindrical shape is provided.

Figure 3:
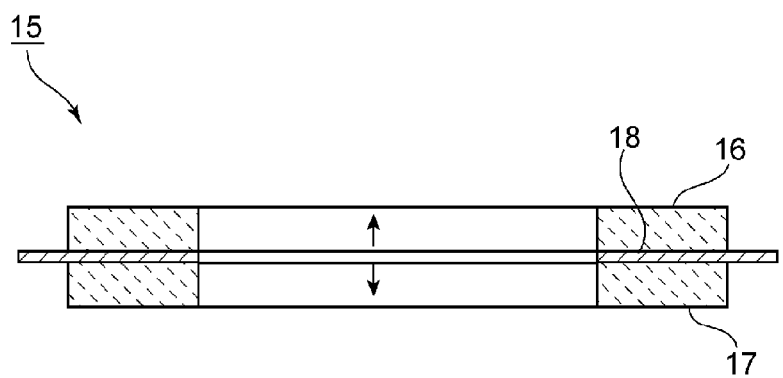
FIG. 3 is a sectional front view of a piezoelectric vibrator used in the first preferred embodiment of the present invention.

A cylindrical vibrating body 12 is fixed to the case member 11. In this preferred embodiment, the cylindrical vibrating body 12 preferably has a circular or substantially circular cylindrical shape. The cylindrical vibrating body 12 preferably includes a piezoelectric vibrator 15 having a circular or substantially circular cylindrical shape, a first cylindrical member 13 having a circular or substantially circular cylindrical shape, and a second cylindrical member 14 having a circular or substantially circular cylindrical shape. As illustrated in FIG. 3, the circular or substantially circular cylindrical piezoelectric vibrator 15 includes piezoelectric plates 16 and 17 each having a circular or substantially circular cylindrical shape. Directions shown by arrows in FIG. 3 represent polarization directions of the piezoelectric plates 16 and 17. That is, in the thickness direction, the polarization direction of the piezoelectric plate 16 and the polarization direction of the piezoelectric plate 17 are opposite from each other. A cylindrical terminal 18 is disposed between the piezoelectric plates 16 and 17. Also, a cylindrical terminal 19 is disposed between the piezoelectric plate 16 and the second cylindrical member 14.

In various preferred embodiments of the present invention, the cylindrical vibrating body and the cylindrical piezoelectric vibrator may have a rectangular or substantially rectangular cylindrical shape, instead of a circular or substantially circular cylindrical shape. Preferably, a circular or substantially circular cylindrical shape, that is, a ring shape is used.

The piezoelectric plates 16 and 17 are preferably made of a PZT piezoelectric ceramic material, for example. However, other piezoelectric ceramic materials, such as (K,Na)NbO$_3$, may be used. Alternatively, a piezoelectric single crystal, such as LiTaO$_3$, may be used.

Unillustrated electrodes are provided on both surfaces of each of the piezoelectric plates 16 and 17. These electrodes preferably have, for example, a laminate structure of Ag/NiCu/NiCr. The terminal 18 is disposed in contact with the inner electrodes of the piezoelectric plates 16 and 17 in the laminate direction. This terminal 18 is made of an appropriate conductive material. As such a conductive material, Cu, Ag, Al, or an alloy primarily composed of these materials, for example, may be suitably used.

Returning to FIG. 1, the first cylindrical member 13 preferably having a circular or substantially circular cylindrical shape is fixed to a lower surface of the piezoelectric vibrator 15. The first cylindrical member 13 includes a mount portion 13a preferably having a circular or substantially circular cylindrical shape and opening outward in the radial direction. The piezoelectric vibrator 15 is disposed on the mount portion 13a. An external thread portion 13b is provided on an upper outer peripheral surface of an inner end portion of the mount portion 13a in the radial direction.

The first cylindrical member 13 is made of metal. As the metal, for example, duralumin, stainless steel, or kovar may preferably be used. However, the first cylindrical member 13 may be made of a semiconductor having conductivity, for example, Si.

The second cylindrical member 14 is disposed on the first cylindrical member 13. The second cylindrical member 14 includes a lower end surface 14a. The lower end surface 14a preferably having a circular or substantially circular cylindrical shape is in contact with an upper surface of the piezoelectric vibrator 15. That is, the piezoelectric vibrator 15 is held between the lower end surface 14a and the mount portion 13a. Both of the first cylindrical member 13 and the second cylindrical member 14 are preferably made of metal and have conductivity. By applying an alternating-current electric field between the terminal 18 and the terminal 19, the piezoelectric vibrator 15 is able to be vibrated longitudinally or transversely. An internal thread portion is provided on an inner peripheral surface of the second cylindrical member 14 near the lower end surface 14a. Thus, the first cylindrical member 13 is screwed into the second cylindrical member 14, and the first cylindrical member 13 is fixed to the second cylindrical member 14. As a result of the screwing, the lower end surface 14a and the mount portion 13a described above are in pressure contact with the upper surface and the lower surface of the piezoelectric vibrator 15, respectively.

Therefore, the entire cylindrical vibrating body 12 is efficiently vibrated by vibration generated in the piezoelectric vibrator 15. In this preferred embodiment, the cylindrical vibrating body 12 is efficiently oscillated by a longitudinal effect or a transverse effect.

On the other hand, a mode converting connected member 21 is provided integrally with the second cylindrical member 14. In this preferred embodiment, the second cylindrical member 14 and the mode converting connected member 21 are preferably made of metal and are integrally connected. However, the second cylindrical member 14 and the mode converting connected member 21 may be separate members. The connection structure of the mode converting connected member 21 and the cylindrical vibrating body is not particularly limited as long as the mode converting connected member 21 is able to convert and increase the mode of vibration of the cylindrical vibrating body 12 when the vibration is transmitted, as will be described later.

In this preferred embodiment, a flange 14b projects outward on the upper surface of the second cylindrical member 14. The flange 14b is placed on and fixed to the recess 11b of the above-described case member 11.

The above-described cylindrical vibrating body 12 is structured such that the portion where the flange 14b is provided defines and functions as a vibration node. Therefore, even when the cylindrical vibrating body 12 is fixed at the flange 14b to the case member 11, vibration of the cylindrical vibrating body 12 is rarely lost.

In this preferred embodiment, the mode converting connected member 21 preferably has a circular or substantially circular cylindrical shape. The mode converting connected member 21 may have other shapes, such as a rectangular or substantially rectangular cylindrical shape. As in various modifications to be described later, the shape of the mode converting connected member 21 may be appropriately changed.

The mode converting connected member 21 preferably is made of metal. The metal is not particularly limited, and an appropriate metal, such as stainless steel, duralumin, or kovar, may preferably be used. Alternatively, a semiconductor material having conductivity, such as Si, may be used instead of the metal. To improve the actions of the mode converting connected member converting the vibration mode and increasing the amplitude, the mode converting connected member 21 is preferably made of a material with little vibration loss.

As will be described later, the mode converting connected member 21 converts the vibration mode and to increase vibration generated in the cylindrical vibrating body 12 when the vibration is transmitted to a light transmitting body to be described next.

A flange 21a projects outward from both ends of the mode converting connected member 21. A lower portion connected to the flange 21a defines a thin portion 21b. The thickness of the thin portion 21b is smaller than the thickness of the cylindrical vibrating body 12. For this reason, the cylindrical thin portion 21b is greatly displaced by vibration transmitted from the cylindrical vibrating body 12. The existence of the thin portion 21b increases the vibration, especially, the amplitude thereof. The thin portion 21b may be provided in at least a portion that is below the flange 21a. When the flange 21a is not provided, the thin portion 21b may be provided in at least a portion of the cylindrical mode converting connected member 21. The thin portion 21b preferably has a cylindrical or substantially cylindrical shape in the cylindrical mode converting connected member 21.

A light transmitting body 22 is fixed on the flange 21a. The light transmitting body 22 includes a cavity that opens downward. A flange 22a projects outward from the cavity opening downward. The flange 22a is bonded to the flange 21a. This bonding is made with, for example, an adhesive or a brazing material. Alternatively, thermocompression bonding or anode bonding may be used.

The light transmitting body 22 has a dome shape extending upward from an inner end of the flange 22a. In this preferred embodiment, the dome shape is preferably hemispherical or substantially hemispherical. For example, the camera body 3 has a viewing angle of about 170°. However, the dome shape is not limited to the hemispherical or substantially hemispherical shape. The dome shape may be a combination of a hemisphere and a cylinder or a curved shape smaller than the hemisphere. The entire light transmitting body 22 preferably has a light transmitting property. In this preferred embodiment, the light transmitting body 22 is preferably made of glass. However, the material of the light transmitting body 22 is not limited to glass, and may be, for example, a transparent plastic material. Alternatively, the light transmitting body 22 may be made of a light-transmitting ceramic material. However, toughened glass is preferably used depending on the purpose. This increases the strength. Further, when glass is used, a coating layer made of, for example, DLC may be provided on a surface of the glass to increase the strength.

Inside the light transmitting body 22, the above-described lens module 7 is disposed. An image of an external subject to be imaged is taken through the light transmitting body 22.

The entire light transmitting body 22 preferably has a light transmitting property. However, a light transmitting portion may be provided only in a front portion of the light transmitting body 22 where the lenses 9 of the lens module 7 are arranged. Preferably, the entire light transmitting body 22 defines a light transmitting portion as in this preferred embodiment.

To more advantageously prevent adhesion of water drops, a hydrophobic film is preferably provided on an outer surface of the light transmitting body 22. Alternatively, a hydrophilic film may be provided so that water moves to a portion where the hydrophilic film is provided. That is, for example, a hydrophilic portion may be provided in a region other than a region where an image is taken by the lenses 9 so that water drops move toward the hydrophilic portion.

Next, a description will be provided of the operation of the vibration device 2 for removing water drops.

For example, when the camera 1 is installed outdoors, water drops of rain sometimes adhere to the surface of the light transmitting body 22. To remove the water drops, the piezoelectric vibrator 15 is driven. That is, an alternating-current electric field is applied to the piezoelectric vibrator 15. While the alternating-current electric field is not particularly limited, a sufficient current, such as a sinusoidal wave, to remove water drops is preferably applied. As a result, the piezoelectric vibrator 15 vibrates in a longitudinal vibration mode or a transverse vibration mode. Along therewith, the cylindrical vibrating body 12 including the first cylindrical member 13 and the second cylindrical member 14 provided integrally with the piezoelectric vibrator 15 vibrates by a longitudinal effect or a transverse effect. In the transverse effect, the cylindrical vibrating body 12 vibrates in a breathing vibration mode. On the other hand, in the longitudinal effect, the cylindrical vibrating body 12 vibrates in a longitudinal vibration mode.

In this preferred embodiment, the resonant frequency of the vibration mode of the longitudinal effect and the transverse effect in the cylindrical vibrating body 12 and the resonant frequency of the vibration mode in the light transmitting body 22 are preferably substantially equal to each other, and more preferably, are equal to each other.

Vibration of the cylindrical vibrating body 12 is transmitted to the mode converting connected member 21. The vibration mode is converted and the amplitude is increased by the mode converting connected member 21. As a result, the light transmitting body 22 greatly vibrates, water drops are atomized, and the water drops adhering to the outer surface of the light transmitting body 22 vanish. Alternatively, the adhering water drops may be directly scattered from the outer surface of the light transmitting body 22 or may be caused to flow downward. This enables the water drops to be advantageously removed.

The vibration device 2 is structured such that vibration greater than vibration of the cylindrical vibrating body 12 is generated in the light transmitting body 22 because the mode converting connected member 21 is provided. This reduces the load on the piezoelectric vibrator 15. That is, the water drops are able be advantageously removed without greatly deforming the piezoelectric vibrator 15.

Figure 4:
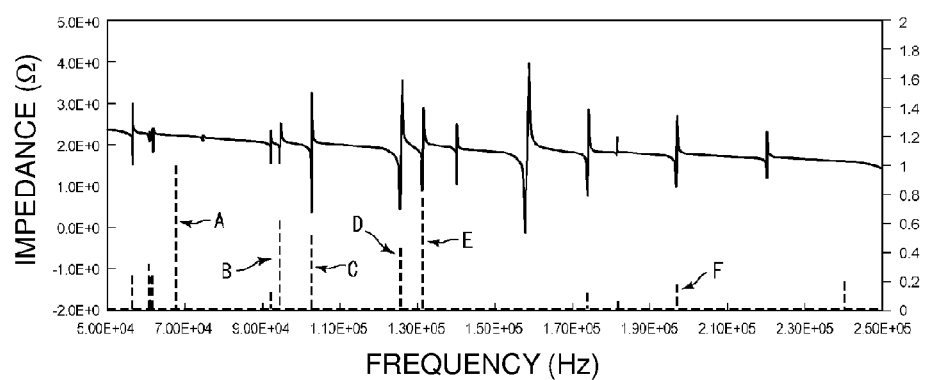
FIG. 4 shows the relationship between the resonant characteristics and the displacement amount of a vertex of a light transmitting body in the first preferred embodiment of the present invention.

When the piezoelectric vibrator 15 is driven, as described above, the vibration mode is converted by the mode converting connected member 21, and the vibration is transmitted to the light transmitting body 22. FIG. 4 shows the relationship between the resonance characteristics and the displacement amount of the vertex of the light transmitting body when the frequency driving the piezoelectric vibrator 15 is variously changed. In FIG. 4, a solid line shows the resonance characteristics, and a broken line shows the displacement amount of the vertex.

FIG. 4 shows that various resonance responses appear when the driving frequency is changed. It is also known that, as shown by the broken line in FIG. 4, the displacement amount of the vertex greatly varies according to the vibration mode, separately from the magnitude of the resonance response.

It is also known that the displacement amount of the vertex is large at arrows A to F in FIG. 4. It is known that a larger displacement amount is obtained particularly at arrows A to E. The displacement states of the vibration device at arrows A to F are schematically illustrated in FIGS. 5 to 10.

FIGS. 5 to 10 respectively show the displacement states of the vibration device corresponding to the displacement amounts shown by arrows A to F in FIG. 4.

Figure 5:
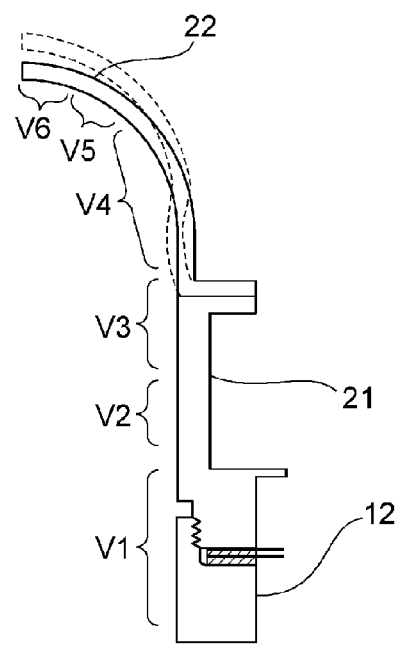
FIG. 5 is a schematic view explaining a displacement state of the vibration device corresponding to a displacement amount shown by arrow A in FIG. 4.

In FIG. 5, the cylindrical vibrating body 12 is vibrated in a breathing vibration mode by a transverse effect, and the light transmitting body 22 is displaced in a bending vibration mode. In this case, the mode converting connected member 21 converts the breathing vibration mode into the bending vibration mode. A large displacement amount is obtained at the vertex of the light transmitting body 22, as shown by arrow A in FIG. 4. That is, the vibration mode is converted and the amplitude is increased by the mode converting connected member 21.

The following displacement amounts at portions V1 to V6 in FIG. 5 were determined by simulation.

Portion V1: range of 0 to about 2.3 µm. Portion V2: range of 0 to about 2.3 µm. Portion V3: range of 0 to about 4.6 µm. Portion V4: range of about 4.6 µm to about 13.8 µm. Portion V5: range of about 18.4 µm to about 20.7 µm. Portion V6: range of about 20.7 µm to about 23.0 µm.

The above displacement amounts are the results of simulation when the dimensions of the cylindrical vibrating body 12, the mode converting connected member 21, and the light transmitting body 22 are as follows.

Dimensions of cylindrical vibrating body 12: inner diameter about 22.0 mm, outer diameter about 32.0 mm, length about 11.2 mm;

Dimensions of mode converting connected member 21: inner diameter about 22.0 mm, outer diameter about 28.0 mm, length about 11.2 mm;

Dimensions of light transmitting body 22: spherical shell inner diameter about 22.0 mm, thickness about 1.0 mm.

In the following FIGS. 6 to 10, the displacement amounts of the portions V1 to V6 were similarly determined.

Figure 6:
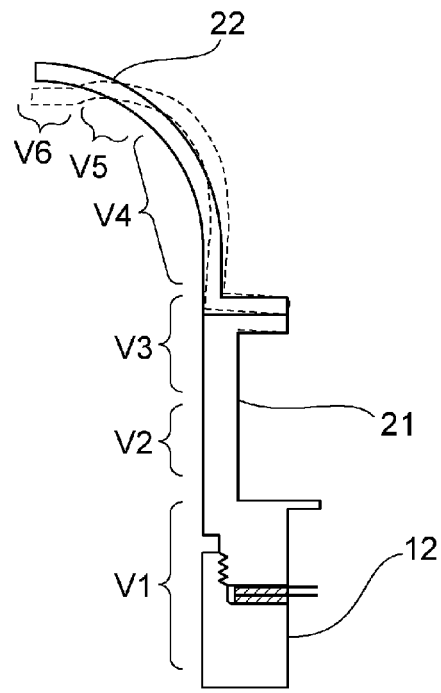
FIG. 6 is a schematic view explaining a displacement state of the vibration device corresponding to a displacement amount shown by arrow B in FIG. 4.

In a state illustrated in FIG. 6, the cylindrical vibrating body 12 is vibrated in a breathing vibration mode by a transverse effect. That is, the cylindrical vibrating body 12 vibrates to become small and large in the radial direction. In this case, the light transmitting body 22 repeats displacements shown by a solid line and a broken line. That is, the light transmitting body 22 vibrates in a higher-order mode of a bending vibration mode. In this case, a large displacement amount is also obtained, as shown by arrow B in FIG. 4.

The displacement amounts at the portions V1 to V6 in FIG. 6 were as follows.

Portion V1: range of 0 to about 1.5 µm. Portion V2: range of 0 to about 1.5 µm. Portion V3: range of 0 to about 1.5 µm. Portion V4: range of about 3.0 µm to about 9.0 µm. Portion V5: range of about 7.5 µm to about 12.0 µm. Portion V6: range of about 12.0 µm to about 15.0 µm.

Figure 7:
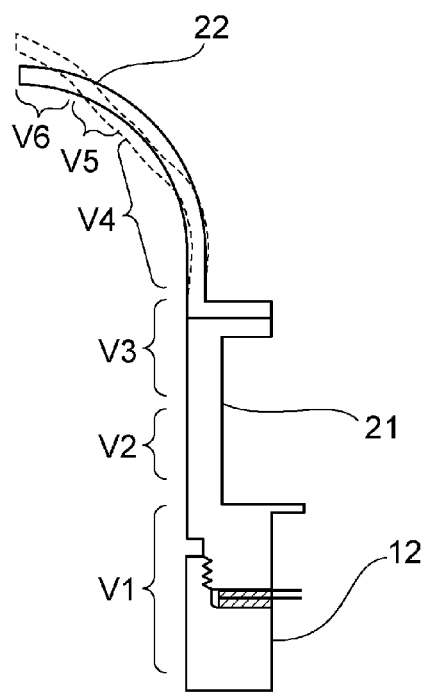
FIG. 7 is a schematic view explaining a displacement state of the vibration device corresponding to a displacement amount shown by arrow C in FIG. 4.

In a displacement state illustrated in FIG. 7, the cylindrical vibrating body 12 is vibrated in a breathing vibration mode by a transverse effect. The light transmitting body 22 defining and functioning as the dome portion vibrates between a state shown by a solid line and a state shown by a broken line, and also vibrates in a higher-order mode of a bending vibration mode. In this case, a large displacement amount is also obtained at the vertex of the light transmitting body 22, as shown by arrow C in FIG. 4.

The displacement amounts at the portions V1 to V6 in FIG. 7 were as follows.

Portion V1: range of 0 to about 1.2 µm. Portion V2: range of 0 to about 1.2 µm. Portion V3: range of 0 to about 2.4 µm. Portion V4: range of about 2.4 µm to about 8.4 µm. Portion V5: range of about 7.2 µm to about 10.8 µm. Portion V6: range of about 9.6 µm to about 12.0 µm.

Figure 8:
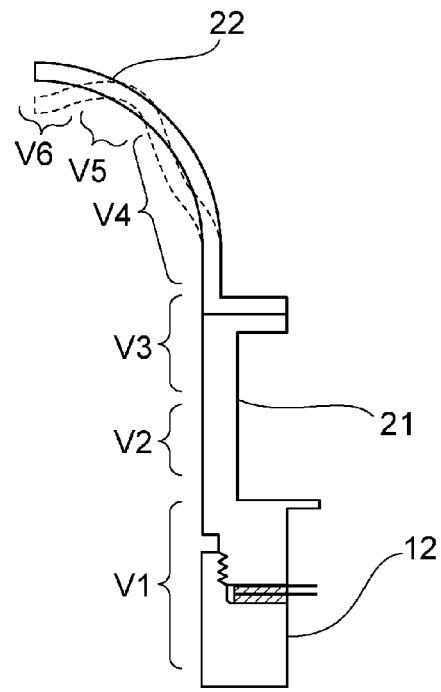
FIG. 8 is a schematic view explaining a displacement state of the vibration device corresponding to a displacement amount shown by arrow D in FIG. 4.

In a displacement state illustrated in FIG. 8, the cylindrical vibrating body 12 is vibrated in a breathing vibration mode by a transverse effect. The light transmitting body 22 vibrates between a state shown by a solid line and a state shown by a broken line, that is, vibrates in a higher-order mode of the breathing vibration mode. In this case, a large displacement amount is also obtained in the light transmitting body 22, as shown by arrow D in FIG. 4.

The displacement amounts at the portions V1 to V6 in FIG. 8 were as follows.

Portion V1: range of 0 to about 1.1 µm. Portion V2: range of 0 to about 1.1 µm. Portion V3: range of 0 to about 1.1 µm. Portion V4: range of 0 to about 5.5 µm. Portion V5: range of about 5.5 µm to about 8.8 µm. Portion V6: range of about 7.7 µm to about 11.0 µm.

Figure 9:
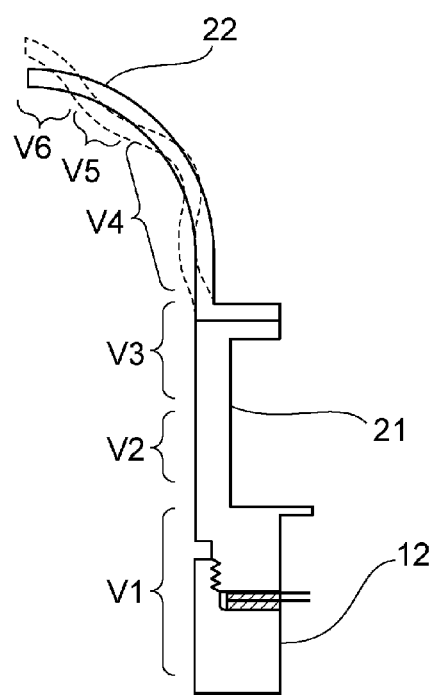
FIG. 9 is a schematic view explaining a displacement state of the vibration device corresponding to a displacement amount shown by arrow E in FIG. 4.

In a displacement state illustrated in FIG. 9, the cylindrical vibrating body 12 is vibrated in a breathing vibration mode by a transverse effect. In this case, the light transmitting body 22 repeats a state shown by a solid line and a state shown by a broken line. That is, it is known that the light transmitting body 22 vibrates in a higher-order mode of a bending vibration mode. In this case, it is known that a large displacement amount is also obtained, as shown by arrow E.

The displacement amounts at the portions V1 to V6 in FIG. 9 were as follows.

Portion V1: range of 0 to about 1.8 µm. Portion V2: range of 0 to about 1.8 µm. Portion V3: range of 0 to about 1.8 µm. Portion V4: range of about 1.8 µm to about 10.8 µm. Portion V5: range of about 3.6 µm to about 14.4 µm. Portion V6: range of about 7.7 µm to about 11.0 µm.

Figure 10:
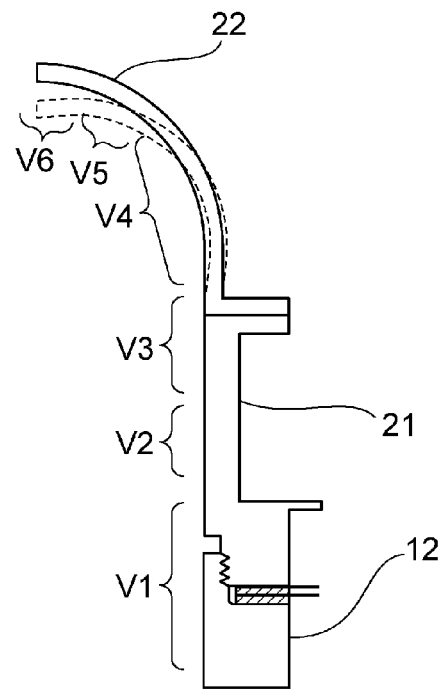
FIG. 10 is a schematic view explaining a displacement state of the vibration device corresponding to a displacement amount shown by arrow F in FIG. 4.

In a displacement state illustrated in FIG. 10, the cylindrical vibrating body 12 is vibrated in a longitudinal vibration mode by a longitudinal effect. In this case, the light transmitting body 22 vibrates in a breathing vibration mode. In this case, the displacement amount at the vertex of the light transmitting body 22 is also sufficiently large, as shown by arrow F in FIG. 4.

The displacement amounts at the portions V1 to V6 in FIG. 10 were as follows.

Portion V1: range of 0 to about 0.45 μm. Portion V2: range of 0 to about 0.45 μm. Portion V3: range of 0 to about 0.90 μm. Portion V4: range of about 0.45 μm to about 3.15 μm. Portion V5: range of about 3.15 μm to about 3.60 μm. Portion V6: range of about 3.60 μm to about 4.50 μm.

In the present preferred embodiment, when the maximum displacement amount of the piezoelectric vibrator 15 in the cylindrical vibrating body 12 is taken as $X_0$ and the maximum displacement amount at the vertex of the light transmitting body 22 is taken as $X_a$, $X_a/X_0=500$ or more is achieved. Therefore, the amplitude is sufficiently increased by the mode converting connected member 21. Thus, the water drops are able to be advantageously removed, and the load on the piezoelectric vibrator 15 is reduced, as described above.

Even when a solution other than water, such as ethanol, a water solution in which, for example, salt or an antifreezing agent (calcium chloride) is dissolved, droplets containing impurities that are not dissolved in water, such as muddy water, or a colloidal solution, such as coffee, (hereinafter referred to as droplets) adheres to the camera, it is able to be similarly removed. Specifically, droplets are atomized with contents left dissolved by greatly vibrating the light transmitting body 22, and this removes the droplets adhering to the outer surface of the light transmitting body 22. This action is different from evaporation, and is able to cause dissolved matter/impurities in the droplets to vanish together with the droplets without being deposited.

Below is the result of a first experiment. The dimensions of a cylindrical vibrating body 12, a mode converting connected member 21, and a light transmitting body 22 used in the first experiment are as follows.

Dimensions of cylindrical vibrating body 12: inner diameter about 8.0 mm, outer diameter about 18.0 mm, length about 16.0 mm. Dimensions of mode converting connected member 21: inner diameter about 8.0 mm, outer diameter about 18.0 mm, length about 5.7 mm. Dimensions of light transmitting body 22: spherical shell inner diameter about 8.0 mm, thickness about 1.0 mm.

For example, a salt water of about 0.4% (a water solution obtained by dissolving 14 g of NaCl in 1 liter of water) was dripped onto the light transmitting body 22 little by little, and was continuously atomized. Specifically, about 15 ml of salt water was dripped in one hour. In this case, the water solution could also be caused to vanish without deposition of NaCl contained in the salt water.

Further, as for a colloidal solution, such as coffee, and a solution other than water, such as ethanol, the solution adhering to the outer surface of the light transmitting body 22 could be similarly caused to vanish without deposition of the contents on the light transmitting body 22.

In the case of droplets containing impurities that are not dissolved in water, for example, mud, when the vibration device is set in a proper direction (i.e., downward direction), the water drops are able to be atomized together with the impurities that are not dissolved in water and the water drops adhering to the outer surface of the light transmitting body 22 is caused to vanish. Although the impurities sometimes remain on the light transmitting body 22 when the amount or size of the impurities is large, such residues fall by its own weight and vibration occurring in the light transmitting body 22. Thus, the view of the light transmitting body 22 will not become unclear.

Below is a result of a second experiment. Dimensions of a cylindrical vibrating body 12, a mode converting connected member 21, and a light transmitting body 22 used in the second experiment are the same or substantially the same as those used in the first experiment.

For example, when the vibration device was disposed in a direction inclined downward at an angle of about 45° to the horizontal direction and droplets obtained by dispersing about 10 g of general soil in about 90 ml of water were dripped on the light transmitting body 22 little by little and were continuously atomized (in this case, about 15 ml was dripped per hour), impurities having a small particle diameter were atomized together with the water and vanished from the outer surface of the light transmitting body 22. Although impurities having a large particle diameter remained on the light transmitting body 22, they fell after a certain amount of time and were removed from the outer surface of the light transmitting body 22.

In the present preferred embodiment, the thickness of the first cylindrical member 13 and the thickness of the second cylindrical member 14 are preferably equal or substantially equal to each other, and the piezoelectric vibrator 15 is provided in the center or approximate center of the cylindrical vibrating body 12 in the thickness direction. However, in the present invention, the structure of the cylindrical vibrating body is not limited thereto.

Figure 11:
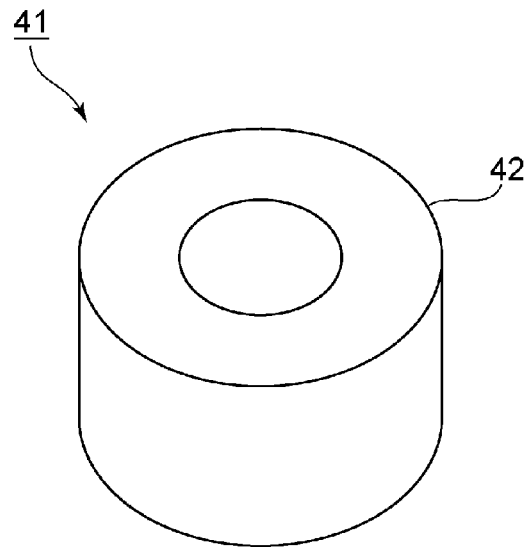
FIG. 11 is a perspective view illustrating a modification of a cylindrical vibrating body.

FIG. 11 is a perspective view illustrating a modification of the cylindrical vibrating body. A cylindrical vibrating body 41 illustrated in FIG. 11 is preferably defined only by a cylindrical piezoelectric body 42. That is, the thickness of the piezoelectric vibrator 15 in the first preferred embodiment is sufficiently increased, and the first cylindrical member 13 and the second cylindrical member 14 are omitted. In this manner, the cylindrical vibrating body 41 may be defined only by the piezoelectric vibrator.

Figure 12:
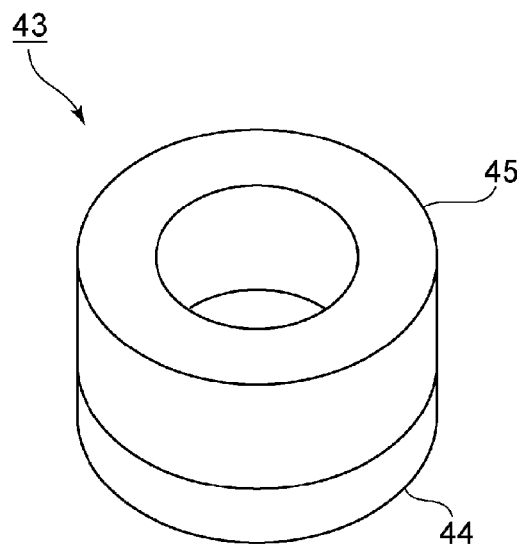
FIG. 12 is a perspective view illustrating another modification of the cylindrical vibrating body.

FIG. 12 is a perspective view illustrating another modification of the cylindrical vibrating body. In a cylindrical vibrating body 43, a cylindrical member 45 made of, for example, metal is bonded on one surface of a cylindrical piezoelectric vibrator 44. In this manner, a unimorph cylindrical vibrating body in which a metal plate is bonded on one surface of the cylindrical piezoelectric vibrator 44 may preferably be used.

Figure 13:
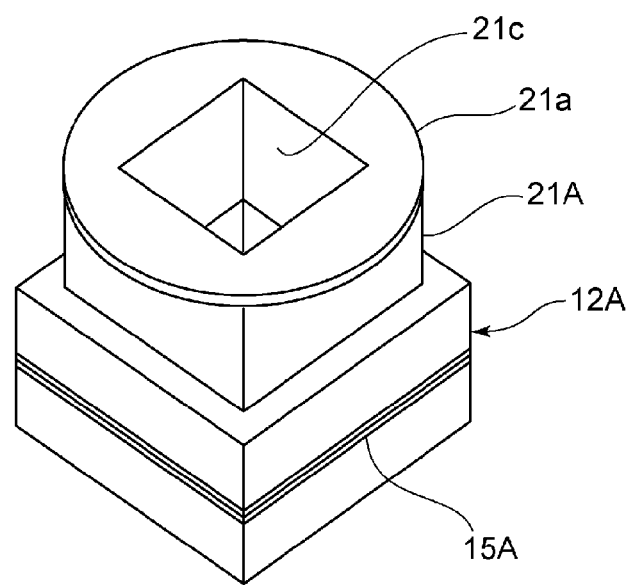
FIG. 13 is a perspective view illustrating a cylindrical vibrating body and a mode converting connected member in a vibration device according to a second preferred embodiment of the present invention.

FIG. 13 is a perspective view illustrating a cylindrical vibrating body and a mode converting connected member in a vibration device according to a second preferred embodiment of the present invention. As illustrated in FIG. 13, a cylindrical vibrating body 12A having a rectangular or substantially rectangular cylindrical shape is preferably provided in the second preferred embodiment. The cylindrical vibrating body 12A having a rectangular or substantially rectangular cylindrical shape is preferably square or substantially square in plan view, and includes a square cavity. A piezoelectric vibrator 15A also preferably has a rectangular or substantially rectangular frame shape. Such a cylindrical vibrating body 12A having a rectangular or substantially rectangular cylindrical shape may be used. In this case, a mode converting connected member 21A also preferably has a rectangular or substantially rectangular cylindrical shape, and includes a rectangular or substantially rectangular cavity 21c. In FIG. 13, a flange 21a projects outward at an upper end of the mode converting connected member 21A. A portion other than the flange 21a defines a thin portion. Therefore, the thickness of the mode converting connected member 21A is smaller than the thickness of the cylindrical vibrating body 12A. That is, the entire mode converting connected member 21A defines the thin portion. The light transmitting body 22 illustrated in FIG. 1 is fixed on the flange 21a. In this manner, in various preferred embodiments of the present invention, the cylindrical vibrating body and the mode converting connected member may have a rectangular or substantially rectangular cylindrical shape, instead of a circular or substantially circular cylindrical shape, as in the cylindrical vibrating body 12A and the mode converting connected member 21A.

FIGS. 14A and 14B to FIGS. 17A and 17B are schematic sectional front views of first to eighth modifications of combinations of a cylindrical vibrating body and a mode converting connected member in a preferred embodiment of the present invention.

Figure 14A:
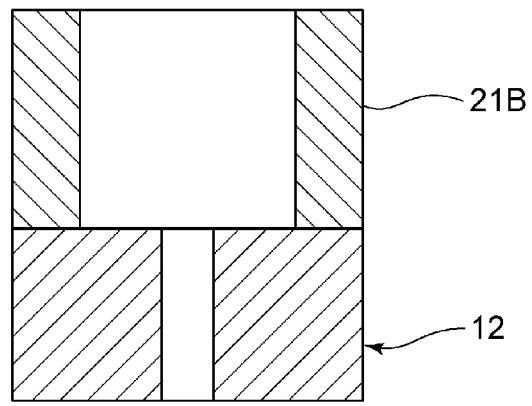
FIGS. 14A and 14B are schematic sectional front views, respectively, illustrating first and second modifications of a combination of the cylindrical vibrating body and the mode converting connected member in a preferred embodiment of the present invention.

In a first modification illustrated in FIG. 14A, a mode converting connected member 21B having a circular or substantially circular cylindrical shape is connected onto a cylindrical vibrating body 12 shaped like a circular cylinder. Herein, the outer diameter of the mode converting connected member 21B is preferably equal or substantially equal to the outer diameter of the cylindrical vibrating body 12. The inner diameter of the mode converting connected member 21B is larger than the inner diameter of the cylindrical vibrating body 12.

Figure 14B:
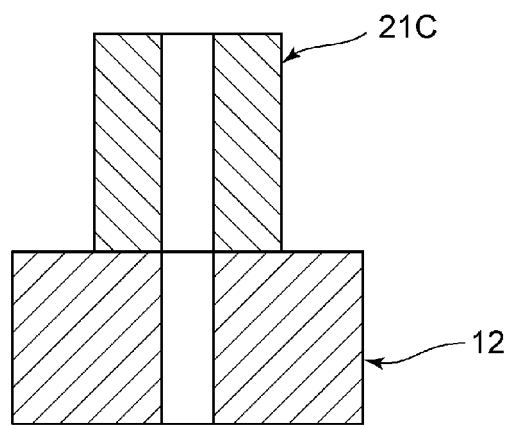

In a second modification illustrated in FIG. 14B, a cylindrical vibrating bod 12 and a mode converting connected member 21C have a circular or substantially circular cylindrical shape. Herein, the outer diameter of the mode converting connected member 21C is smaller than the outer diameter of the cylindrical vibrating body 12. The inner diameter of the cylindrical vibrating body 12 and the inner diameter of the mode converting connected member 21C are equal or substantially equal to each other. In this modification, the entire mode converting connected member 21C also defines a thin portion.

In the first and second modifications, the cylindrical vibrating body 12 may also have a rectangular or substantially rectangular cylindrical shape. The mode converting connected members 21B and 21C may also have a rectangular or substantially rectangular cylindrical shape.

Figure 15A:
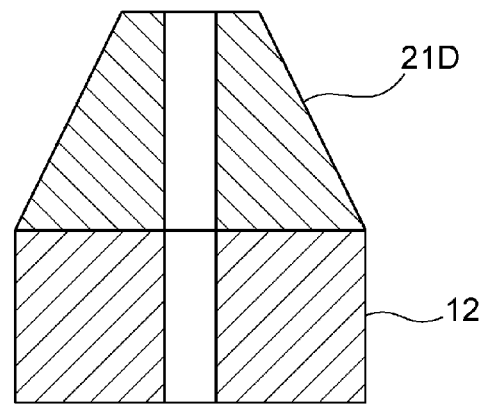
FIGS. 15A and 15B are schematic sectional front views, respectively, illustrating third and fourth modifications of a combination of the cylindrical vibrating body and the mode converting connected member in a preferred embodiment of the present invention.
Figure 15B:
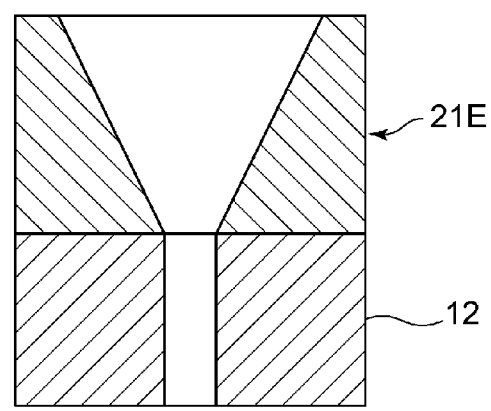

In a third modification illustrated in FIG. 15A, a mode converting connected member 21D is tapered so that the outer diameter thereof decreases with an increasing distance from a cylindrical vibrating body 12. In this manner, the mode converting connected member may be tapered like the mode converting connected member 21D. Herein, a portion of the mode converting connected member 21D whose thickness is smaller than the thickness of the cylindrical vibrating body 12 corresponds to a thin portion. In FIG. 15B, a portion of a mode converting connected member 21E whose thickness is smaller than the thickness of a cylindrical vibrating body 12 also defines a thin portion.

In a fourth modification illustrated in FIG. 15B, the cross-sectional area of a hollow portion of the mode converting connected member 21E increases with an increasing distance from the cylindrical vibrating body 12. In this way, in the mode converting connected member 21E, the thickness may be changed to decrease with an increasing distance from the cylindrical vibrating body 12.

Figure 16A:
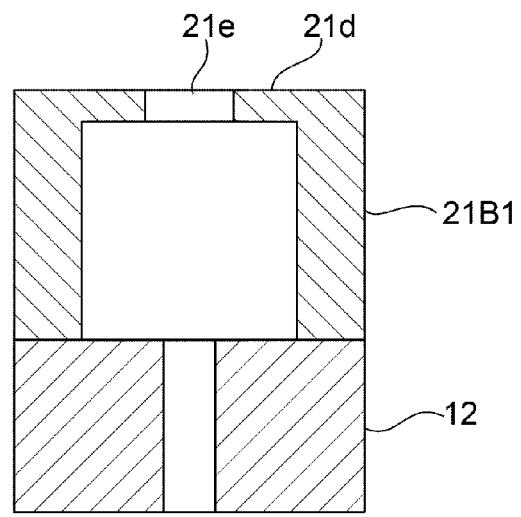
FIGS. 16A and 16B are schematic sectional front views, respectively, illustrating fifth and sixth modifications of a combination of the cylindrical vibrating body and the mode converting connected member in a preferred embodiment of the present invention.

In a fifth modification illustrated in FIG. 16A, an inward flange 21d projects inward at an upper end of a mode converting connected member 21B1. This makes the opening area of an opening 21e smaller than that of a hollow space in the mode converting connected member 21B1.

In FIG. 16A, a portion of the mode converting connected member 21B1 lower than the inward flange 21d defines a thin portion.

Figure 16B:
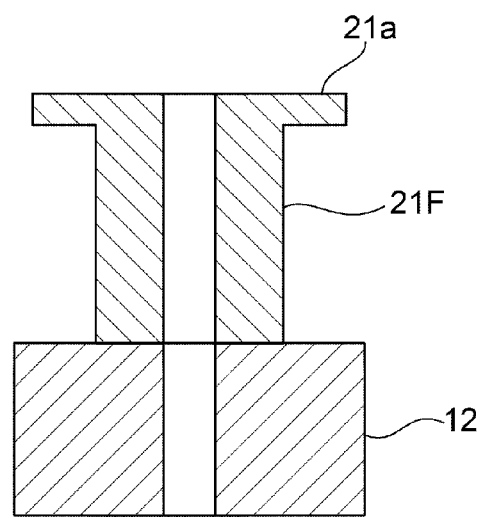

Conversely, as in a sixth modification illustrated in FIG. 16B, a flange 21a projecting outward may be provided at an upper end of a mode converting connected member 21F, similarly to the first preferred embodiment.

Figure 17A:
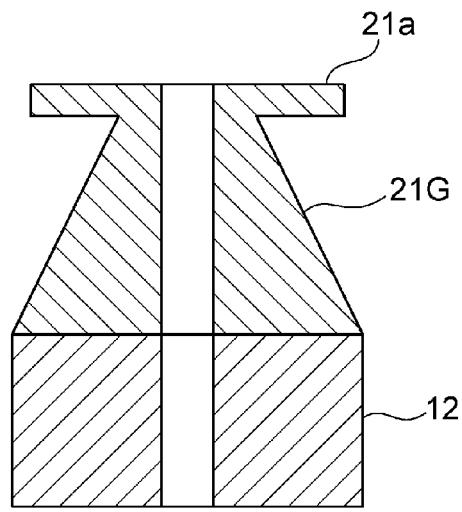
FIGS. 17A and 17B are schematic sectional front views, respectively, illustrating seventh and eighth modifications of a combination of the cylindrical vibrating body and the mode converting connected member in a preferred embodiment of the present invention.

In a seventh modification illustrated in FIG. 17A, a mode converting connected member 21G has a structure similar to that of the mode converting connected member 21D illustrated in FIG. 15A. However, a flange 21a projecting outward is provided at an upper end of the mode converting connected member 21G. In this manner, the flange 21a may be provided at the upper end of the tapered portion.

Figure 17B:
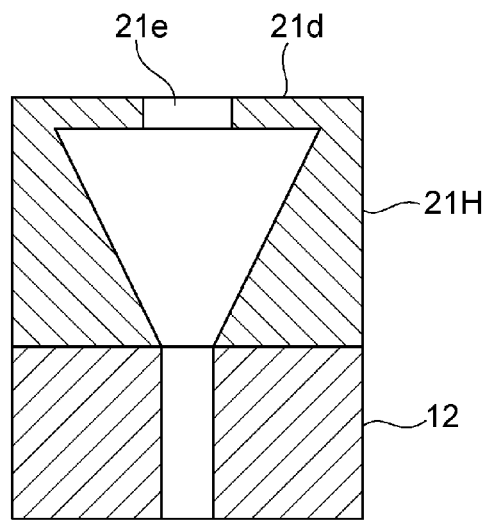

In a mode converting connected member 21H according to an eighth modification illustrated in FIG. 17B, an inward flange 21d projecting inward is provided at an upper end of the same structure as that of the mode converting connected member 21E illustrated in FIG. 15B. This makes the area of an opening 21e small.

In FIGS. 17A and 17B, portions of the mode converting connected members 21G and 21H whose thicknesses are smaller than the thickness of the cylindrical vibrating body 12 define thin portions.

As is clear from the above-described first to eighth modifications, the shapes of the cylindrical vibrating body 12 and the mode converting connected member may be variously changed.

Figure 18:
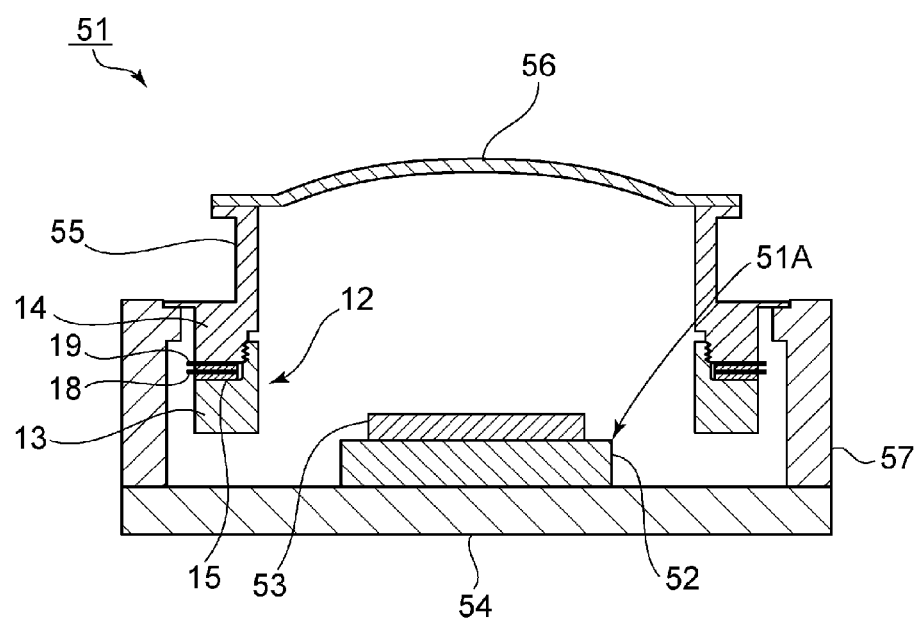
FIG. 18 is a sectional front view of a camera according to a third preferred embodiment of the present invention.

FIG. 18 is a sectional front view of a camera according to a third preferred embodiment of the present invention. A camera 51 according to the third preferred embodiment includes a vibration device and a camera body stored in the vibration device. The camera body includes a body member 51A. The body member 51A is fixed to a base plate 54. The camera body includes a circuit board 52 provided in the body member 51A and an image pickup element 53 provided on the circuit board 52. A lens 56 is set to be opposed to the image pickup element 53. This lens 56 has a convex outer surface and a concave inner surface. That is, the inner surface projects outward. Therefore, the outer surface of the lens 56 is curved, similarly to the light transmitting body 22 of the first preferred embodiment. The viewing angle of the lens 56 preferably is, for example, about 160°. One end of a mode converting connected member 55 to be described later is bonded to an outer peripheral edge of the lens 56.

The vibration device 51 includes a cylindrical case member 57. In this preferred embodiment, the cylindrical case member 57 preferably has a circular or substantially circular cylindrical shape. However, the case member 57 may have other shapes, such as a rectangular or substantially rectangular cylindrical shape. The case member is preferably made of, for example, metal or synthetic resin.

A lower end of the case member 57 is fixed to the base plate 54. On an upper end side of the case member 57, a cylindrical projecting portion projects inward in the radial direction. A recess having a circular or substantially circular cylindrical shape is provided in an upper surface of the projecting portion.

A cylindrical vibrating body 12 is fixed to the case member 57. In this preferred embodiment, the cylindrical vibrating body 12 has a circular or substantially circular cylindrical shape. The cylindrical vibrating body 12 includes a piezoelectric vibrator 15 having a circular or substantially circular cylindrical shape, a first cylindrical member 13 having a circular or substantially circular cylindrical shape, and a second cylindrical member 14 having a circular or substantially circular cylindrical shape, similarly to the first preferred embodiment.

The first cylindrical member 13 is fixed to one principal surface of the piezoelectric vibrator 15. The second cylindrical member 14 is disposed on the other principal surface of the first cylindrical member 13. The entire cylindrical vibrating body 12 is efficiently vibrated by vibration generated in the piezoelectric vibrator 15. In the present preferred embodiment, the cylindrical vibrating body 12 is efficiently oscillated by a longitudinal effect or a transverse effect.

A mode converting connected member 55 similar to that of the first preferred embodiment is provided integrally with the second cylindrical member 14. In this preferred embodiment, the second cylindrical member 14 and the mode converting connected member 55 are preferably made of metal and are integrally connected. An outer peripheral edge of the lens 56 is bonded to one end of the mode converting connected member 55. The cylindrical vibrating body 12 is bonded to the other end of the mode converting connected member 55.

Although schematically illustrated in FIG. 18, the mode converting connected member 55 includes a thin portion having a thickness smaller than the thickness of the cylindrical vibrating body 12. In this preferred embodiment, the thickness of the entire mode converting connected member 55 is smaller than that of the cylindrical vibrating body 12, and the entirety of the mode converting connected member 55 defines a thin portion. The mode converting connected member 55 has a structure similar to that of the mode converting connected member 21 in the first preferred embodiment. That is, the mode converting connected member 55 is configured to convert the vibration mode of the cylindrical vibrating body 12 and to increase the vibration. This gives a great vibration to the lens 56.

In the present preferred embodiment, the resonant frequency of the vibration mode in the cylindrical vibrating body is preferably equal or substantially equal to the resonant frequency of vibration of the lens 56. This more effectively increases the vibration.

The cylindrical vibrating body 12 may vibrate in either a longitudinal vibration mode or a transverse vibration mode, similarly to the first preferred embodiment. Further, the vibration mode of the lens 56 may be either a bending vibration mode or a breathing vibration mode, and is not particularly limited. In the camera 51 of the present preferred embodiment, the lens 56 is greatly vibrated, and is able to remove water drops adhering to the outer surface of the lens 56 and cause the water drops to flow down, as described above. In this manner, the vibration device may be structured to include the lens 56 itself.

Figure 19:
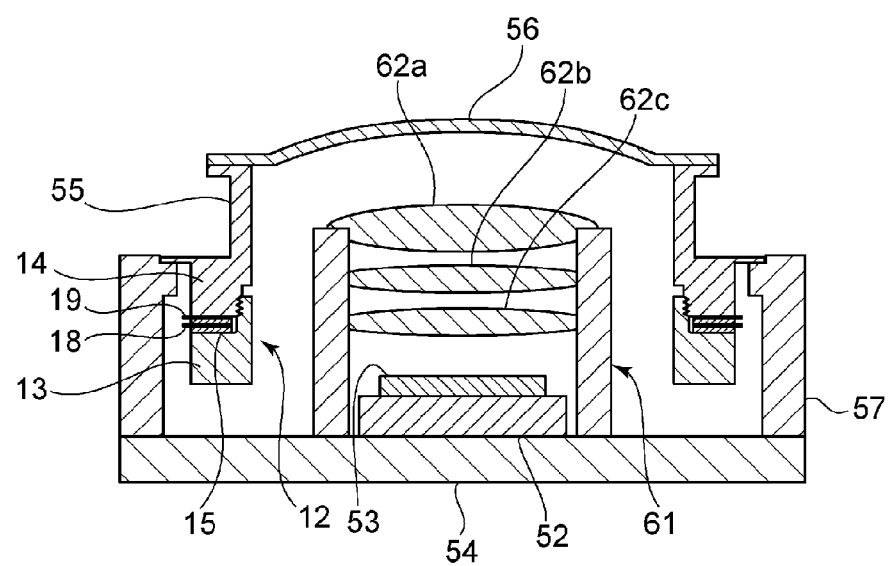
FIG. 19 is a sectional front view of a camera according to a modification of the third preferred embodiment of the present invention.

While the camera 51 according to the third preferred embodiment of the present invention includes the single lens 56, a separate lens module 61 may be disposed between the lens 56 and the image pickup element 53 in order to adjust the optical path, as illustrated in FIG. 19. The lens module 61 includes a cylindrical body and a plurality of lenses 62a to 62c provided inside the cylindrical body. The lens module 61 is provided on the base plate 54. Instead of the lens module 61, one or more lenses may be disposed between the lens 56 and the image pickup element 53.

Figure 20:
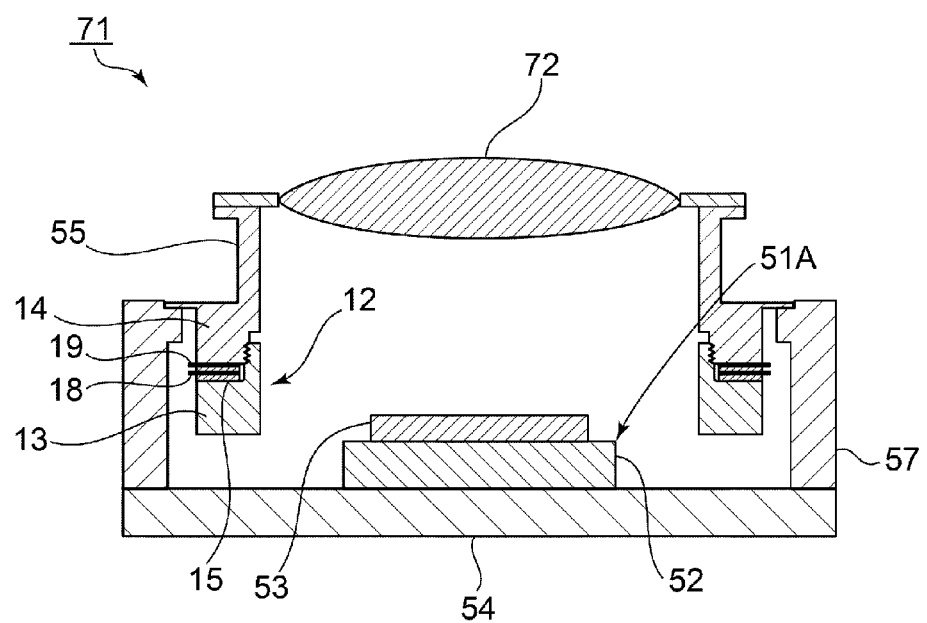
FIG. 20 is a sectional front view of a camera according to a fourth preferred embodiment of the present invention.

As in a camera 71 according to a fourth preferred embodiment illustrated in FIG. 20, a convex lens 72 may be bonded to a mode converting connected member 55.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vibration device used in a camera body including a lens, the vibration device comprising:
   a cylindrical vibrating body including a cylindrical member and a piezoelectric vibrator fixed to the cylindrical member;
   a cylindrical mode converting connected member connected to one end of the cylindrical vibrating body; and
   a light transmitting body connected to a side of the mode converting connected member opposite from a side to which the cylindrical vibrating body is connected, and disposed on a front side of the lens; wherein
   the mode converting connected member includes a thin portion having a thickness smaller than a thickness of the cylindrical vibrating body.

2. A vibration device used in a camera body including a lens, the vibration device comprising:
   a cylindrical vibrating body including a cylindrical member and a piezoelectric vibrator fixed to the cylindrical member; and
   a cylindrical mode converting connected member connected to one end of the cylindrical vibrating body and connected to the lens of the camera on a side opposite from a side connected to the one end of the cylindrical vibrating body; wherein
   the mode converting connected member includes a thin portion having a thickness smaller than a thickness of the cylindrical vibrating body.

3. The vibration device according to claim 1, wherein the mode converting connected member converts a vibration mode of the cylindrical vibrating body into a vibration mode of the light transmitting body and increases vibration.

4. The vibration device according to claim 1, wherein a volume of the mode converting connected member is smaller than a volume of the cylindrical vibrating body.

5. The vibration device according to claim 1, wherein the piezoelectric vibrator is cylindrical or substantially cylindrical.

6. The vibration device according to claim 3, wherein a resonant frequency of the vibration mode in the light transmitting body is equal or substantially equal to a resonant frequency of a vibration mode of a longitudinal effect or a transverse effect in the cylindrical vibrating body.

7. The vibration device according to claim 2, wherein a resonant frequency of a vibration mode in the lens is equal or substantially equal to a resonant frequency of a vibration mode of a longitudinal effect or a transverse effect in the cylindrical vibrating body.

8. The vibration device according to claim 1, wherein a flange extending outward is provided at an end of the cylindrical vibrating body on a side of the mode converting connected member.

9. The vibration device according to claim 8, wherein a node of a vibration of the cylindrical vibrating body exists in the flange.

10. The vibration device according to claim 1, wherein the cylindrical vibrating body has a circular or substantially circular cylindrical shape.

11. The vibration device according to claim 1, wherein the cylindrical vibrating body has a rectangular or substantially rectangular cylindrical shape.

12. The vibration device according to claim 1, wherein the mode converting connected member has a circular or substantially circular cylindrical shape.

13. The vibration device according to claim 1, wherein the light transmitting body has a dome shape including a curved light transmitting portion disposed on a front side of the lens.

14. The vibration device according to claim 13, wherein a vibration mode in the dome-shaped light transmitting body is a breathing vibration mode.

15. The vibration device according to claim 13, wherein a vibration mode in the dome-shaped light transmitting body is a bending vibration mode.

16. The vibration device according to claim 2, wherein a vibration mode of the lens is a breathing vibration mode.

17. The vibration device according to claim 2, wherein a vibration mode of the lens is a bending vibration mode.

18. The vibration device according to claim 1, wherein the mode converting connected member is defined by a cylindrical body having the same or substantially the same outer diameter as an outer diameter of the cylindrical vibrating body.

19. The vibration device according to claim 1, wherein the mode converting connected member is defined by a cylindrical body that is thinner than the cylindrical vibrating body.

20. The vibration device according to claim 1, wherein at least one of an outer diameter and an inner diameter of the mode converting connected member continuously changes from an end portion near the cylindrical vibrating body toward the light transmitting body.

21. The vibration device according to claim 1, wherein a flange extending toward a center portion of the cylindrical body or an outer side portion of the cylindrical body is provided at an end of the mode converting connected member near the light transmitting body.

22. A camera comprising:
   the vibration device according to claim 1; and
   a camera body with at least a portion thereof being stored in the vibration device.

* * * * *